United States Patent [19]
Rodden et al.

[11] Patent Number: 5,791,598
[45] Date of Patent: Aug. 11, 1998

[54] DYNAMIC BIAS FOR ORBITAL YAW STEERING

[75] Inventors: John J. Rodden, Los Altos; Nobuo Furumoto, Sunnyvale, both of Calif.; Walter Fichter, Munich; Ernst Bruederle, Ottobrunn, both of Germany

[73] Assignee: Globalstar L.P. and Daimler-Benz Aerospace AG

[21] Appl. No.: 585,954

[22] Filed: Jan. 12, 1996

[51] Int. Cl.⁶ .................. B64G 1/28; B64G 1/36; B64G 1/38
[52] U.S. Cl. .................. 244/165; 244/171; 364/454; 364/459
[58] Field of Search .................. 244/158 R, 164, 244/165, 171; 364/453, 454, 459

[56] References Cited

U.S. PATENT DOCUMENTS

| | | | |
|---|---|---|---|
| 4,071,211 | 1/1978 | Muhlfelder et al. | 244/171 X |
| 4,294,420 | 10/1981 | Broquet | 244/171 X |
| 5,184,790 | 2/1993 | Fowell | 244/165 |
| 5,205,518 | 4/1993 | Stetson, Jr. | 244/171 X |
| 5,308,024 | 5/1994 | Stetson, Jr. | 244/171 X |
| 5,452,869 | 9/1995 | Basuthakur et al. | 244/171 X |

FOREIGN PATENT DOCUMENTS

| | | |
|---|---|---|
| 0 071 445 | 7/1982 | European Pat. Off. |
| 0 628 899 | 12/1994 | European Pat. Off. |
| 0 363 244 | 4/1990 | France. |
| 0 493 277 | 7/1992 | France. |

OTHER PUBLICATIONS

H.J. Dougherty et al., "Analysis and Design of Whecon –An Attitude Control Concept", AIAA 2$^{nd}$ Communications Satellite Systems Conference, Apr. 8–10, 1968, No. 68–461, pp. 1–10.

R. Weiss et al., "Seasat-A Attitude Control System", J. Guidance and Control, vol. 1, No. 1, pp. 6–13.

Primary Examiner—William Grant
Attorney, Agent, or Firm—Perman & Green, LLP

[57] ABSTRACT

A method and apparatus for steering a low-earth-orbit communication satellite requiring sun-orientation for solar-power accumulation is disclosed. Momentum-bias both maintains nadir pointing and adds yaw-steering moments for sun-trackig attitude control, simultaneously. The method has two principal steps: 1) open-loop momentum decoupling, for correcting the calculated steering torque, and closed-loop attitude compensation, to correct for perturbations about the calculated attitude in accordance with one of two control law definitions. This combines the advantage of stable gyroscopic attitude control with those of open-loop yaw steering.

20 Claims, 6 Drawing Sheets

DYNAMIC BIAS FOR ORBITAL YAW STEERING

BACKGROUND OF THE INVENTION

1. Field of the Invention

The present invention relates to satellite motion control. More particularly, it is related to dual-orientation orbital attitude control, such as the solar-fixation of a nadir-pointing satellite.

2. Discussion of Related Art

Attitude control of satellites is straight forward when three-axis sensor information is available, such as: 1) an earth horizon sensor providing pitch and roll information, and 2) a sun sensor measuring yaw. However, during the solar-eclipse that occurs each time a satellite orbits the earth, such sun-sensor data is obviously not available.

The use of momentum devices for both attitude sensing and attitude correction, is a concept that is attractive for its simplicity. However, reliance upon momentum sensing rate-gyro instruments for attitude sensing is impractical because they are imprecise, as well as expensive. Momentum sensors are too susceptible to drift. This is especially problematic when the satellite is subject to the significant variation in the torques applied to it, as are satellites that provide yaw-steering.

Supplemental sensors can be added, but this still does not assure continuous yaw information. For example, a magnetometer can be used to supply supplemental yaw data but, as the satellite orbits through the earth's higher latitudes, the earth's magnetic pole tilts toward the satellite and the satellite's magnetometer data becomes too inaccurate to provide adequate attitude control during eclipses that occur at such lattitudes.

The need to operate without continuous yaw information while providing continuous controlled-yaw motion was the first major challenge confronting the design team working on the Globalstar™ communications satellite system.

The second was the need for particularly critical and complex attitude control. The communications antennas of satellites are conventionally mounted on the portion of the satellite that is always nearest to the earth. This is referred to as a "nadir-pointing" attitude. This attitude must be maintained at all times.

Attitude control is particularly critical for communications relay satellites, such as those used in the Globalstar satellite cellular phone system, because they also have very high power requirements. Efficient operation of the solar panels on these satellites requires that the sun's rays be normal to the plane surface of the solar panels at all times. Therefore reliable, precise satellite attitude control is essential to the Globalstar satellite system's mission.

a. Whecon Stabilization

Momentum-bias attitude stabilization systems have successfully been used to provide precise attitude stabilization for fixed-orbit nadir-pointing satellites, without direct yaw sensing. The "Whecon" system, described in the article "Analysis and Design of Whecon—an Attitude Control Concept", by H. J. Dougherty, E. D. Scott, and J. J. Rodden, AIAA paper no. 68-461, *AIAA 2nd Communications Satellite Systems Conference*, San Francisco, Apr. 8–10, 1968, is an example of such a system. The Whecon bias-momentum system provided three-axis satellite stabilization in response to pitch and roll signals from an earth-horizon sensor. Whecon then controlled the residual yaw errors through a dynamic coupling of yaw with the orbital pitch rate.

The Whecon system used: 1) a momentum wheel having a fixed alignment with the spacecraft pitch axis, 2) horizon sensors that detect pitch and roll attitude errors, and 3) mass expulsion devices for responding to those errors, all without direct yaw sensing. However, the momentum wheel's inertia restrains vehicle yaw rotations to small perturbations about zero. This attitudinal rigidity makes the Whecon system inapplicable to solar-powered communications satellite systems that have orbits that precess, as does the Globalstar system. Also, mass expulsion systems use non-renewable energy sources that limit the working life of the satellite.

The use of momentum for attitude control, instead of mass expulsion engines, is a concept that is attractive for its simplicity. However, this system also used mass expulsion to provide control torque. This system was used on a number of U.S. and international synchronous satellites, including military satellites, Intelsat V, and the Canadian Communication Technology Satellite.

b. Seasat Nadir-pointing Momentum Bias

This all-momentum-wheel version of the Whecon attitude stabilization system was developed for the NASA-JPL Seasat satellite, which flew in 1978. This system is described in the article "Seasat A Attitude Control System", by R. Weiss, J. J. Rodden, R. W Hendricks and S. W. Beach, pp 6–13, *Journal of Guidance and Control*, vol. 1, no. 1 (1978). The Seasat platform used momentum wheels for the orbital momentum bias necessary to maintain a nadir-pointing attitude, as well as for vehicle stabilization, instead of using mass expulsion to produce the bias momentum.

Attitude sensing was performed by a pair of "scan" wheels on the satellite. Seasat provided magnetic compensation for the momentum wheels, referred to as "desaturation", to counter the momentum produced by sources of torque that are external to the vehicle, including the earth's gravitational and magnetic fields.

Seasat solar orientation was monitored by a pair of sun-aspect sensors. However, these sun-sensors were not used for orbital attitude control, since Seasat was designed as a sun-synchronous earth satellite. Sun-synchronous earth satellites have a fixed relation to the sun. Such vehicles do not need yaw-steering.

Figure 1:
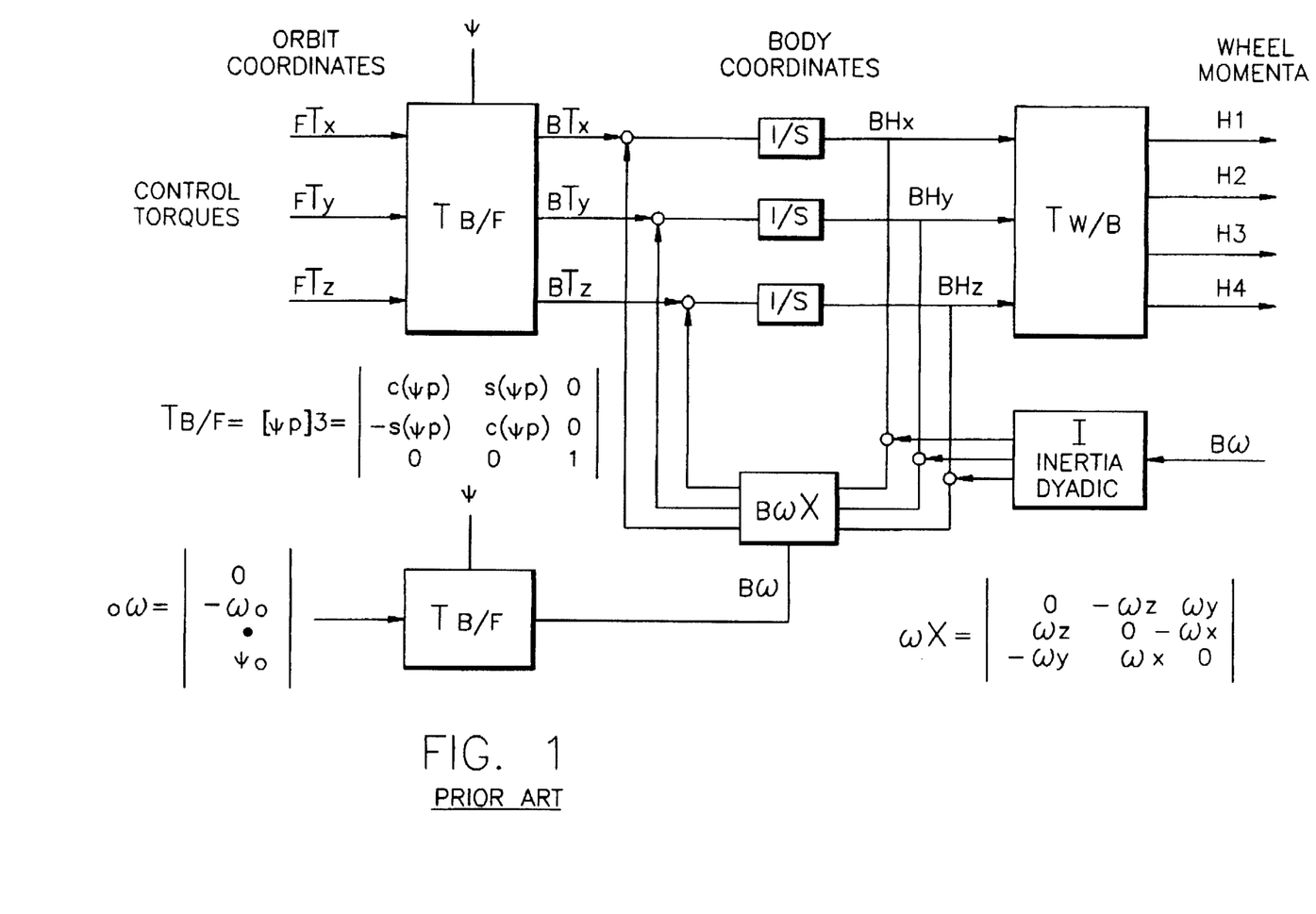
FIG. 1 is a block diagram of momentum integration and decoupling on the Seasat fixed-yaw satellite.

A torque decoupling/integration scheme allowed reaction torque commands to the satellite's momentum wheels to control Seasat in the "Whecon" mode, as shown in FIG. 1. In this mode, control torque vectors applied to the vehicle are adjusted so that they can be treated computationally as though they were produced by Whecon's separate, mass-expulsion control torque, rather than by the momentum wheels themselves.

The Seasat decoupling scheme estimated the additional momentum that would result from commands used to provide the calculated control torques needed for nadir-pointing attitude control. It then applied equal and opposite "decoupling" torques through torque commands sent to its momentum wheels, to counterbalance the dynamic coupling occurring between the control moments and the moment produced by the rate of pitch in its sun-synchronous, nadir-pointing orbital motion around the earth.

In attitude control for non-synchronous orbits, such dynamic interactions also occur as momentum is transferred between multiple wheels in the satellite to provide the yaw motion needed to track the sun. These interactions occur in GPS system satellites, which use four momentum wheels, an earth horizon sensor, and also a sun sensor to provide attitude control in a non-sun-synchronous orbit. However, the GPS system does not require precise yaw-control, or even yaw-anticipation, because GPS uses a broadcast, rather than a multiple-beam transmission pattern. The GPS antenna signal is the same regardless of its yaw rotation relative to the ground.

Because of this individual satellites can be allowed to yaw slightly each time the sun sensor passes behind the earth. GPS satellites then wait until they once again have sun sensor data, and then use the new data to produce the particular torque commands that will cause their momentum wheels to produce a bias vector that corrects any attitude error that the sun sensors detect.

For the precise yaw-steering required by the Globalstar satellite, which uses only a horizon sensor, the momentum wheels must provide the missing yaw rotation information, as well as Seasat nadir-pointing and GPS sun-tracking bias. This missing yaw information is needed both for continuously precise sun-tracking and for the yaw-anticipation needed for relocating individual transmission beams on the Globalstar vehicle's transmitter antenna.

c. Globalstar's Asynchronous Precession

Solar-powered satellites in orbits that precess, but are not sun-synchronous, can use either a combination of yaw-steering and rotary solar panel motion, or compound motion of the solar panels to track the sun. A nadir-pointing satellite could, alternatively, be articulated between a transmitter end and solar panels mounted at its opposite end to permit the two ends of the satellite to twist relative to each other, as was done by the Seasat platform. However, this requires the power from the panels to be supplied to the transmitter through an additional inefficient, failure-prone connector such as a wiper assembly, etc. This is unacceptable for high-powered, high-reliability relay satellites.

Figure 2:
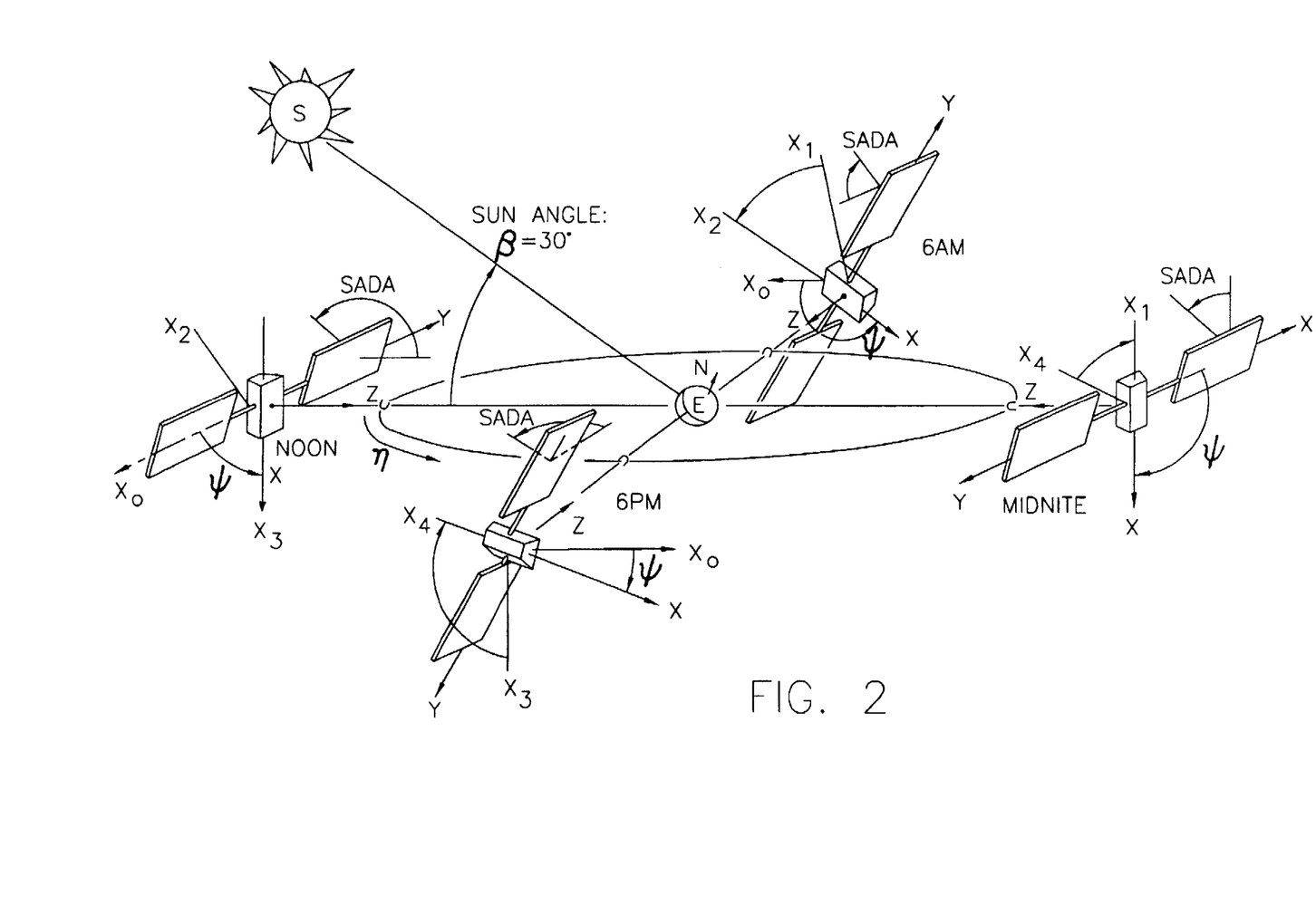
FIG. 2 is a diagram of the orbit of a sun-tracking solar satellite.

FIG. 2 shows the yaw-steering motion needed to keep the solar panels of a sun-tracking solar-powered satellite continuously facing the sun at an optimal angle as the satellite orbits the earth. The solar array is rotated about a y-axis of the vehicle through the angle "SADA", and the vehicle is yawed through the angle "ψ". The magnitude of the yaw excursion variable ψ depends on the angle between the sun and the orbital plane, the angle β. In the limiting case that occurs when the sun is in the plane of the satellite's orbit, β=0 and only the SADA angle is variable. No yaw motion is needed. At higher beta values both SADA and yaw must vary.

For the satellites of the Globalstar™ system, the precession of their orbits produces a beta angle "β" between the satellites' orbital planes and a line from the earth to the sun that varies from zero to about 75 degrees. At β=75, a satellite must provide very large rotations of the solar array about the nadir-pointing z-axis and perpendicular to the pitch axis and a very large SADA angle about the y-axis, to maintain solar-power efficiency.

If yaw-steering is not used, the secondary deflection of the solar array about that z-axis perpendicular to the pitch axis must be reduced, to prevent one of the solar panels from crossing into areas where they reduce the operating efficiency and coverage pattern of the satellite's relay operation each time they reach maximum yaw deflection, by interfering with the satellite's antennas.

This limit on the compound motion of the solar panels causes less-than-optimal sun tracking. Less-than-optimal sun tracking by the panels requires a substantial increase in their size, to offset the resulting decrease in efficiency. Very large arrays, however, are subject to gravity gradient perturbation effects, as well as being more expensive and massive. Thus compound motion of the solar panels is not a satisfactory solution of the problem.

If the GPS satellites' attitude control system could be adapted to provide the precision yaw-steering necessary for the Globalsat system, both the satellite's structural integrity and the effectiveness of its antenna system would be preserved. However this kind of precise attitude control requires a second, very accurate, contiunously-controlled angular rate offset, so that the satellite's attitude points the solar panel normal to the sun instead of moving the solar panels themselves or twisting the satellite amidships, i.e., between the antenna and the solar panels.

Both stable, momentum-wheel driven yaw-steering control, and anticipatory coordination of the satellite antenna's beam pattern with yaw rotation can be implemented in accordance with the present invention.

SUMMARY OF THE INVENTION

A momentum-bias steering system in accordance with the present invention provides decoupling of the angular moments of torques generated by yaw-steering actions from the orbital dynamics of the satellite.

A momentum-bias steering system in accordance with the present invention provides attitude sensing without reliance on additional sensors by the decoupling of the angular moments of torques generated by yaw-steering actions from the orbital dynamics of the satellite.

Advantageously, an orbital attitude control system in accordance with the present invention provides precise, pre-planned, yaw-steered solar orientation for the solar panels supplying power to a nadir-pointed communications satellite. In particular embodiments, a respective one of two control laws using earth sensor data is used to provide stabilization and control.

BRIEF DESCRIPTION OF THE DRAWINGS

The features and advantages of the present invention will be better understood when the detailed description of a preferred embodiment, given below, is considered in conjunction with the drawing appended hereto, wherein.

DETAILED DESCRIPTION OF A PREFERRED EMBODIMENT

Figure 3:
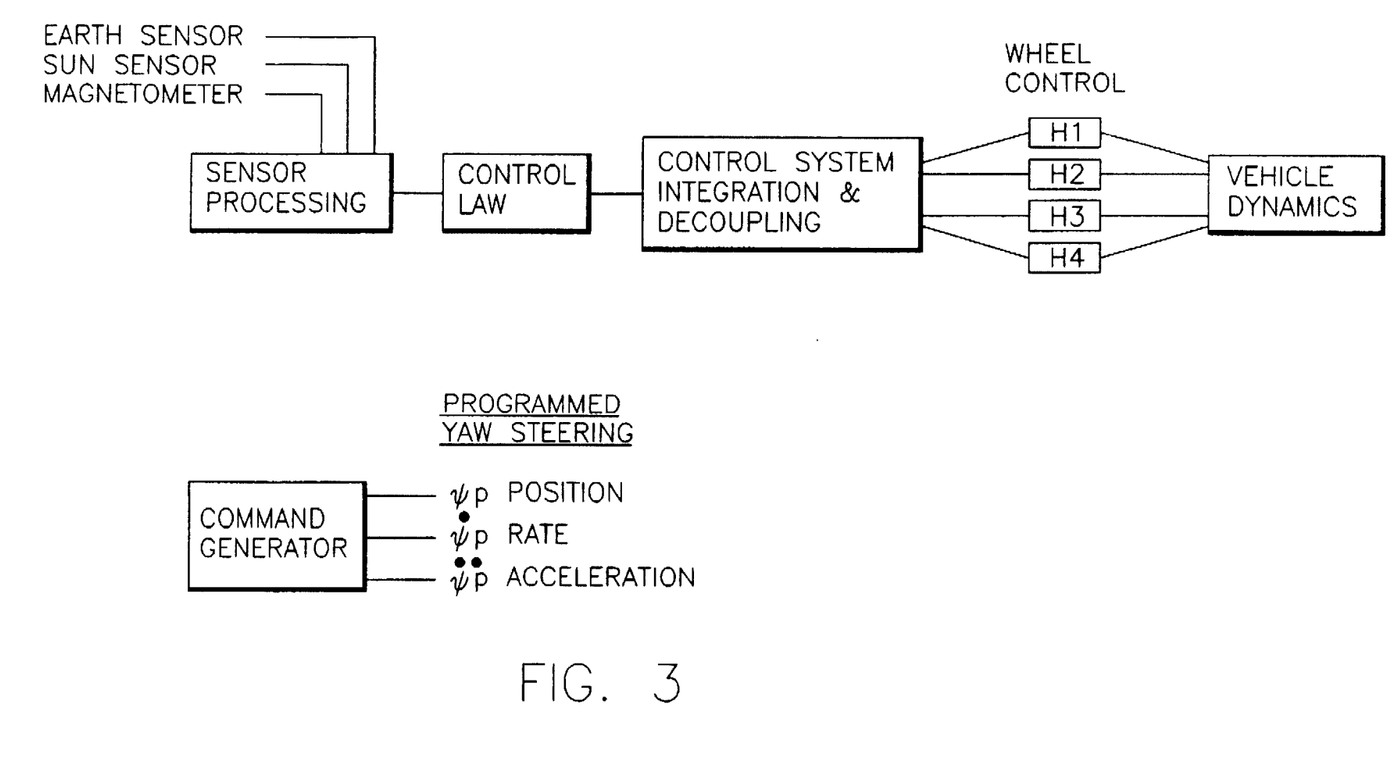
FIG. 3 shows a preferred embodiment of yaw-steering control system according to the present invention.

A preferred embodiment of yaw-steering control in accordance with the present invention is shown in FIG. 3. In this system, an earth horizon sensor and momentum wheel feedback supplies input data that is then processed in accordance with a particular control law and decoupled from reaction torques and momentum-wheel perturbations to generate torque command signals.

The torque commands then modulate the rotation of a distributed set of four reaction/momentum wheels. Any subset of three of these wheels is capable of fully providing three-axis attitude control for the satellite.

The Command Generator provides the desired yaw-steering profile $\psi^*$ and its attendant derivative rate and acceleration for applying the control law to the required yaw-steering motion. The magnetometer and sun-sensor operate independently from the yaw-steering control system described herein.

Spacecraft Dynamics

The satellite motion equation expressed in terms of nominal angular velocity "$\omega^*$" is, where T=0:

$$T^* = I\dot{\omega}^* + |\bar{\omega}^*X|(I\bar{\omega}^* + \bar{h}^*) + \dot{h}^* = 0 \tag{1}$$

The values $\omega^*$ and $h^*$ reflect both the nominal angular orbital rate and the desired yaw-steering rate. The set of equations needed to describe the dynamics of satellite motion and the necessary corrections for external disturbance and gravity gradient torques does not lend itself to analytic solution. To gain insight into these dynamics, the small-angle "linearized" form of these equations is generally used for these explanations.

The linearized dynamics for the rate of angular perturbation about the solution $\omega^*$ where $\omega=\omega^*+\delta\omega$ and $h=h^*+\delta h$ is, if terms higher than first order terms are neglected for the sake of linearity:

$$\delta\bar{T} = I\delta\bar{\omega} + |\bar{\omega}^*X|(I\delta\bar{\omega} + \bar{\delta h}) + |\delta\bar{\omega}X|(I\bar{\omega}^* + \bar{h}^*) + \delta\dot{l} \tag{2}$$

The Euler Rotation Sequences

The attitude angle vector "$\eta$" is the sum of the nominal angular rate of yaw rotation $\psi_R$ and the angular rates of perturbation $\delta\eta$, where $\delta\eta=(\delta\phi, \delta\theta, \delta\psi)^T$, the change in the angular rates on each axis of the satellite body can be expressed as:

The kinematic relationship between the perturbation $$\eta = \begin{vmatrix} \phi \\ \theta \\ \psi \end{vmatrix} = \begin{vmatrix} 0 \\ 0 \\ \psi_R \end{vmatrix} + \delta\eta \tag{3}$$

body rate "$\delta\omega$" and the attitude perturbations "$\delta\eta$" depend on the Euler rotation sequence chosen for the analysis used. The form of the equations for the perturbation angles are strongly dependent on the choice of an Euler sequence. The subsequent control law formulation then follows from the form of, and the terms in, the particular set of perturbation equations used.

Figure 4:
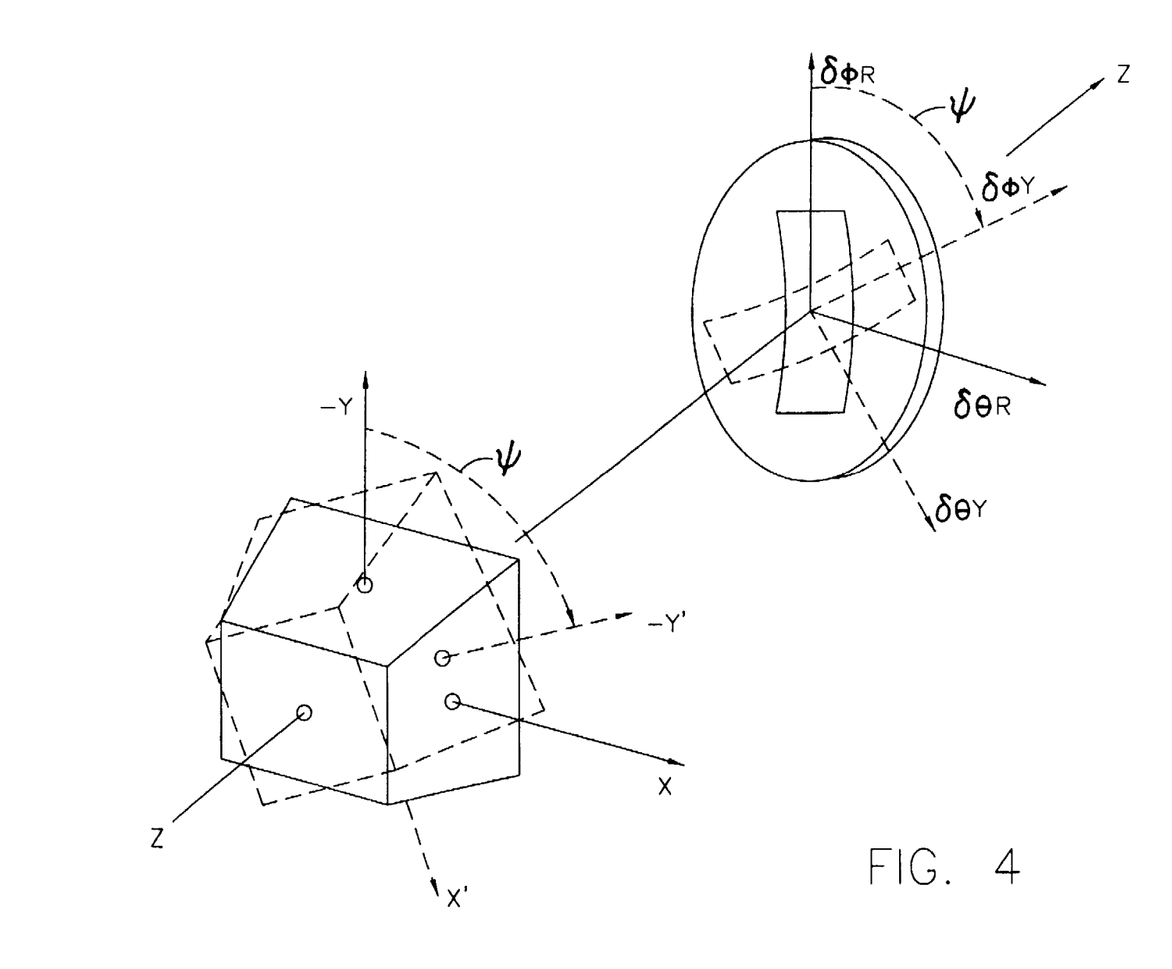
FIG. 4 illustrates roll-first and yaw-first Euler frames of reference.

Two sequence orders for transformations from an earth-orbital to a satellite-body frame of reference are considered: a "yaw first" yaw-pitch-roll (3-2-1) sequence $\delta\eta_R$, and a "roll first" roll-pitch-yaw (1-2-3) sequence $\delta\eta_Y$. FIG. 4 is a diagram of the geometric relation between a line from the vehicle nadir, the z-axis, and the earth-horizon for these two Euler sequences.

The "yaw-first" approach uses the error values measured by the earth-horizon sensor in the control law directly, but transforms them through a synthetic xi-space. The "roll first" approach, transforms those error values back to a near-orbit frame of reference, i.e., to pitch and roll angles that are independent of the vehicle yaw rotation.

Where $\delta\eta=|\delta\phi, \delta\theta, \delta\phi|^T$, the transformation relating the yaw and roll-first parameters is:

$$\delta\eta_R = \begin{vmatrix} \cos\psi^* & -\sin\psi^* & 0 \\ \sin\psi^* & \cos\psi^* & 0 \\ 0 & 0 & 1 \end{vmatrix} \delta\eta_Y \tag{4}$$

Yaw-first Perturbation Dynamics

For an orbital-frame to body-frame transformed "yaw first" yaw-pitch-roll (3-2-1) rotation sequence, the pitch-roll anglular rates correspond to angles measured by a body-fixed earth sensor, and the angular rates of perturbation for this "yaw first" Euler sequence are:

$$\delta\bar{\omega} = \delta\bar{\eta}_Y + |\bar{\omega}^*X|\delta\bar{\eta}_Y \tag{5}$$

Substitution of equation (5) into the linearized satellite dynamics equation (2) yields:

$$\delta\bar{T} = I\delta\ddot{\eta}_Y + P\delta\dot{\eta}_Y + Q\delta\eta_Y + |\bar{\omega}^*x|\delta\bar{h} + \delta\dot{h} \tag{6}$$

Roll-first Perturbation Dynamics

For an orbit using a body-transformed "roll first" roll-pitch-yaw (1-2-3) rotation sequence, the pitch-roll angles correspond to angles transformed from the body-fixed earth sensor back through the reference yaw angle to a frame of reference approximate to earth-orbital coordinates. Perturbation rates for a "roll-first" Euler sequence are:

$$\delta\bar{\omega} = \Psi^*\{\delta\bar{\eta}_R + [W \cdot X]\delta\bar{\eta}_R\} \tag{7}$$

and substitution into equation (2) yields:

$$\delta\bar{T} = I\Psi^*\delta\ddot{\eta}_R + M\delta\dot{\eta}_R + N\delta\eta_R + |\bar{\omega}^*X|\delta\bar{h} + \delta\dot{h} \tag{8}$$

Laws for a Body-Fixed Earth Sensor

Control laws using these Euler Sequences may express perturbation as an angle from yaw or from roll, respectively. The control laws provide the desired actuation torque expressed in the perturbation equation. The perturbations are expressed with respect to a reference trajectory, which is the motion specified by the commanded steering maneuver. The command is the nominal momentum that produced that maneuver.

Wheel torques in the yaw-first control law can be expressed as a function of $\delta\eta_Y$ and a new variable "$\xi$" which is defined below in equation (10), and these wheel torques are:

$$\delta\dot{h} = \delta\dot{h}_{\eta_Y} + \delta\dot{h}_\xi \tag{9}$$

Figure 5:
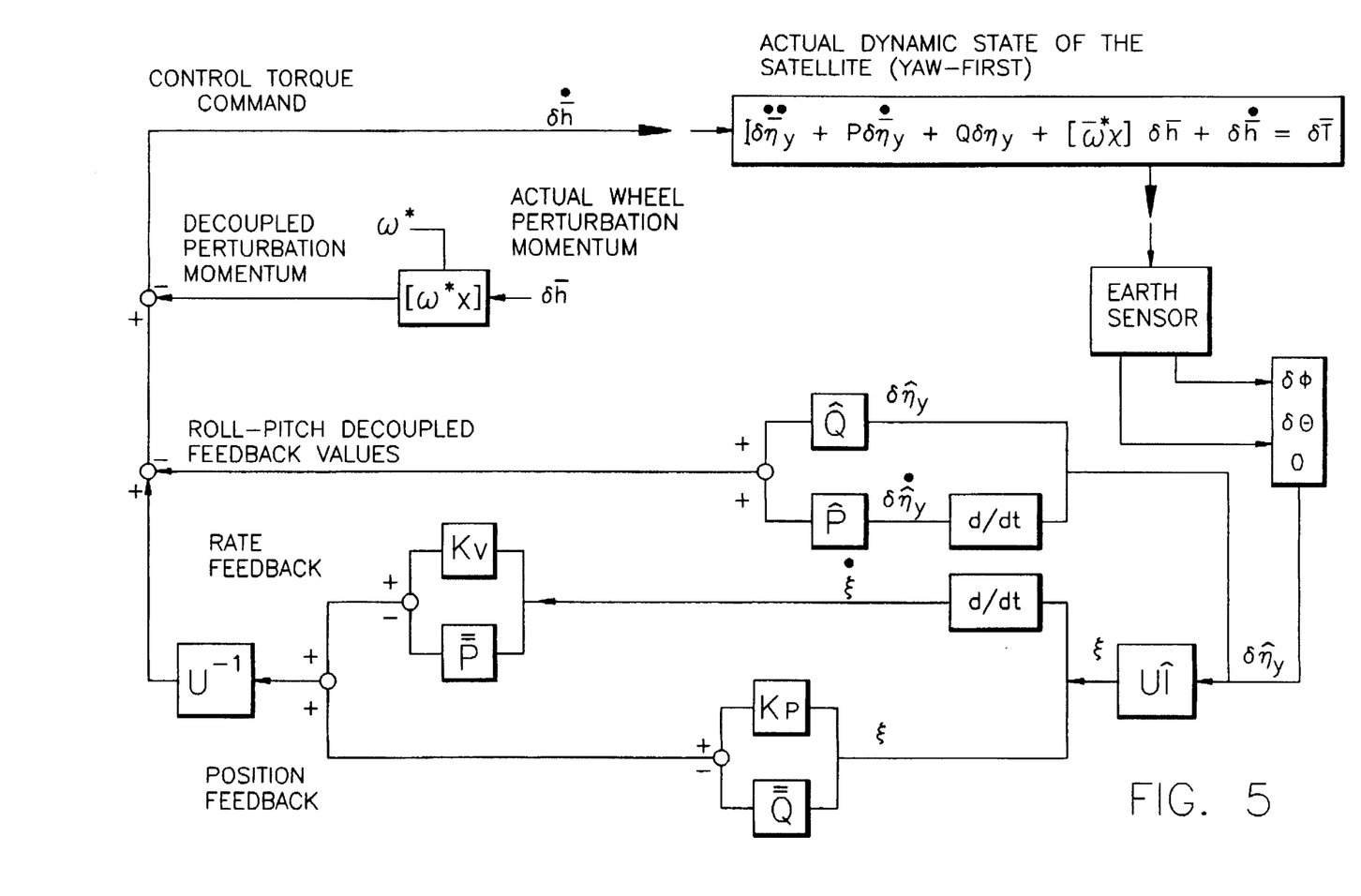
FIG. 5 is a block diagram of a yaw-steering attitude control system in accordance with the present invention using a Yaw-first format Control Law.

The yaw-first control law based on body-fixed sensor signals as shown in FIG. 5, first decouples the momentum terms and then also removes the first two columns of the P and Q matrixes. This simplification of P and Q relies on the roll and pitch angles measured by the earth horizon sensor.

To further decouple the pitch-roll dynamics in this complex system, the perturbation expressions are: 1) Multiplied by the matrix U. This matrix multiplication results in a coefficient matrix UP' containing all zeros except for a term in the first row of the third column which becomes a constant "d". This matrix reflects conditions that approach those assumed by the standard Whecon equation, in which roll and yaw are coupled together through the bias momentum of the wheels, as stated in the *AIAA* article by Dougherty, Scott an Rodden, noted above.

To extend the Whecon concept of indirect yaw control to complex yaw-steering cross-coupling, a change of variables is made using the definition of a synthetic space, in which:

$$\xi = U/\delta\eta_Y \tag{10}$$

After the algebraic details are worked through, a ξ-space transformed perturbation dynamics equation is derived:

$$\ddot{\xi} + |\bar{P} + \bar{\bar{P}}|\dot{\xi} + |\bar{Q} + \bar{\bar{Q}}|\xi + U\delta\ddot{h}\xi = U\delta T \tag{11}$$

where $$P = I|\bar{\omega}^* X| + R,$$

and $$Q = I|\bar{\omega}^* X| + R|\bar{\omega}^* X|$$

$$R = I|\bar{\omega}^* X| - |\dot{H}_B^* X|,$$

and $$[\bar{\omega}^* X] = \begin{vmatrix} 0 & -\omega_z & \omega_y \\ \omega_z & 0 & -\omega_x \\ -\omega_y & \omega_x & 0 \end{vmatrix}$$

Through this transformation: 1) The transformed matrix P now has only a constant element "d" in the upper right position in the matrix. 2) Also, the elements $q_{13}$, $q_{23}$, $q_{33}$ in the Q matrix, although they are time-varying quantities, are small. The non-zero elements in P double bar and Q double bar, which are functions of the angular rate of the reference yaw angle, appear only in the upper left as 2×2 roll and pitch submatrixes. Therefore, these double-bar matrixes are substantially cancelled out when decoupled using the P hat and Q hat estimates.

To remove the remnant of the cross-coupling effects the momentum wheel torques δh* are used to generate a further cancellation to more completely decouple the control torque commands. The resulting highly-decoupled yaw-steering dynamics have little more than a roll-yaw coupling analogous to the standard "Whecon" model of indirect yaw control.

Yaw-first Control Law

With this extra cancellation generated using the perturbation the momentum wheel torques detected by the momentum wheels δh the remaining perturbation relation, can be expressed using gain matrices Kv and Kp, as:

$$\ddot{\xi} + \left\{ \begin{vmatrix} 0 & 0 & \alpha \\ 0 & 0 & 0 \\ 0 & 0 & 0 \end{vmatrix} - K_v \right\} \dot{\xi} + \left\{ \begin{vmatrix} 0 & 0 & q_{13} \\ 0 & 0 & q_{23} \\ 0 & 0 & q_{33} \end{vmatrix} - K_p \right\} \xi = U\delta T \tag{12}$$

where

-continued $$K_v = \begin{vmatrix} K_{v_1} & 0 & 0 \\ 0 & K_{v_2} & 0 \\ K_{\psi_1}K_{v_1} & 0 & 1 \end{vmatrix} \text{ and } K_p = \begin{vmatrix} K_{p_1} & 0 & 0 \\ 0 & K_{p_2} & 0 \\ K_{\psi_1}K_{p_1} & 0 & 1 \end{vmatrix}. By$$

The "standard" Whecon dynamics yields matrixes having a format similar to these. However, the elements diagonally opposite the "d" and "$q_{23}$" elements are missing from the yaw-steering perturbation matrixes. The final wheel torques in ξ-space are then:

$$\delta\ddot{h} = -[\omega^* x]\delta\dot{h} - \dot{P}\delta\bar{\eta}_Y - \dot{Q}\delta\eta_Y + \dot{U}^{-1}\{(K_v - \frac{\hat{A}}{\hat{P}})\dot{\xi} + (K_p - \frac{\hat{A}}{\hat{Q}})\xi\} \tag{13}$$

This control law generated by transformation through the synthetic space, distributes a proportional part of the "roll" control torque to the "yaw" control channel.

Roll-first Control Law

Figure 6:
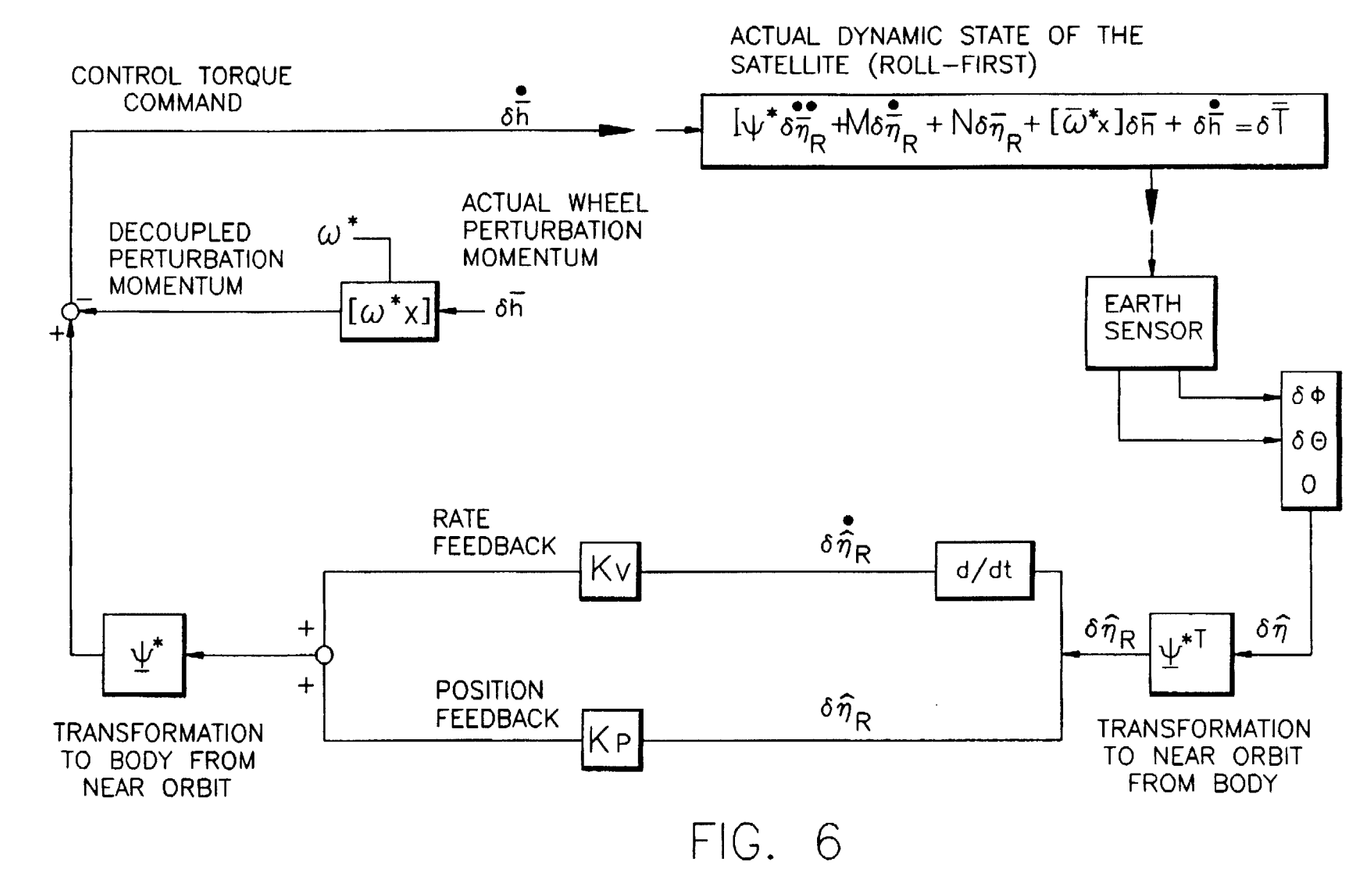
FIG. 6 is a block diagram of a yaw-steering attitude control system in accordance with the present invention using a Roll-first format Control Law.

For an alternate representation of satellite yaw-steering dynamics, only partial decoupling/cancellation need be used in formulating the control law illustrated in FIG. 6. Again, the perturbation angles are:

$$I\Psi^*\delta\ddot{\eta}_R + M\delta\dot{\eta}_R + N\delta\eta_R + [\bar{\omega}^*X]\delta\dot{h} + \delta\ddot{h} = \delta T \tag{8}$$

The control wheel torques for this case are:

$$\delta\ddot{h} = -[\omega^*X]\delta\dot{h} + K_v\delta\dot{\eta}_R + K_p\delta\eta_R \tag{14}$$

The gain matrices, $K_v$ and $K_p$, are of the same form as used previously. After substitution of rate of change expression (9) for δh into the preceding equation and multiplication by $\psi^{*T}$, the final equation becomes:

$$\psi^{*T}\delta T = \psi^{*T}I\Psi^*\delta\ddot{\eta}_R + \psi^{*T}M\delta\dot{\eta}_R + \psi^{*T}N\delta\eta_R + \psi^{*T}\{K_v\delta\dot{\eta}_R + K_p\delta\eta_R\} \tag{15}$$

This alternate control law measures the attitude pitch and roll transformed to a near-earth orbit frame of reference, emulating the standard one-wheel control model by using those measurements in a standard Whecon manner, much as was done for the Seasat platform.

Expansion of the $\psi^{*T}M$ and $\psi^{*T}N$ terms reveals that, for the dominant elements of these matrices, diagonal terms then appear in exactly the same positions as in the "standard" Whecon case. There is possibly increased stability due to this inherent cross coupling of roll to yaw in this complex extension of the Whecon dynamic. The dynamic torque effects of the yaw steering actions are again cancelled by the dynamic decoupling and these actions have become transparent to the control system.

Further definitions of the notation used as follows:

| | |
|---|---|
| skew symmetric cross product matrix | $\lvert 0x \rvert$ |
| spacecraft inertia | diag $(I_{11}\ I_{22}\ I_{33})$ |
| scalar nominal orbit rate | $\omega_0^*$ |
| scalar nominal yaw steering rate | $\psi^*$ |
| scalar total bias momentum | $H_{tot}$ |
| total bias momentum in body | $H_B^*$ |
| nominal wheel momentum | $k^*$ |
| orbit rate | $\omega_c^* = \lvert 0 - \omega_0^* 0 \rvert^T$ |
| reference rate in orbit frame | $W^* = \lvert 0 - \omega_0^* \psi^* \rvert^T$ |
| transformation orbit to reference | $\Psi^* = \begin{bmatrix} \cos\psi^* & \sin\psi^* & 0 \\ -\sin\psi^* & \cos\psi^* & 0 \\ 0 & 0 & 1 \end{bmatrix}$ |
| auxiliary variables | $\omega^* = \psi^* = W^*$ <br> $R = \lvert \omega^*x \rvert I - H_B^*x$ |
| yaw first controls | $P = I[\omega^*x] + R \quad Q = I[\omega^*x] + R\lvert \omega^*x \rvert$ |
| | $U = \begin{bmatrix} \cos\psi^* & \sin\psi^* & 0 \\ -\sin\psi^* & \cos\psi^* & 0 \\ 0 & 0 & 1 \end{bmatrix} \begin{bmatrix} P_{23} & 0 & 0 \\ 0 & P_{13} & 0 \\ 0 & 0 & 1 \end{bmatrix}$ |
| | $P_{13} = H_{tot}^* - I_{11} + I_{33})\omega_0^*\ P_{23} = H_{tot}^* - (I_{22} + I_{33})\omega_p^*$ <br> $P^1 = P\text{-PL} \quad Q^1 = Q\text{-QL} \quad L = \text{diag}\{110\}$ <br> $P_1 = U P^1 \Gamma^{-1} U^{-1} \quad Q_1 = U Q^1 \Gamma^{-1} U^{-1}$ |
| roll first controls | $M = P\Psi^* \quad N = (I\Psi^* + R\Psi^*)\lvert \omega_c^*x \rvert$ |
| control gains | $K_V = \begin{bmatrix} k_{V1} & 0 & 0 \\ 0 & k_{V2} & 0 \\ k_\psi k_{V1} & 0 & 0 \end{bmatrix} \begin{bmatrix} k_{P1} & 0 & 0 \\ 0 & k_{P2} & 0 \\ k_\psi k_{P1} & 0 & 0 \end{bmatrix}$ |

The invention has been discussed with particular reference to a presently preferred embodiment thereof, but it will be apparent to one skilled in the art that variations and modifications are possible within the spirit and scope of this invention. In particular, these respective transforms may use both yaw-first and roll-first formats. The invention is defined by the claims appended below.

We claim:

1. Satellite attitude control apparatus for use in a dynamically controlled yaw rotating spacecraft having axes for locating it in physical space and a vector defined in relation to said axes, said apparatus comprising:

means for decoupling moments acting on the spacecraft relative to said vector defined in relation to said axes locating the spacecraft in physical space; and sensor means, on said spacecraft, for sensing the motion of the spacecraft in two dimensions relative to said vector and producing two-dimensional sensor data indicative thereof;

means for correcting said decoupled moments in accordance with a control law referenced to said two-dimensional sensor data and producing control signals indicative thereof; and means, responsive to said control signals, for providing three-dimensional yaw-steering attitude control relative to said two-dimensional sensor data.

2. The apparatus of claim 1 wherein said correcting means corrects in accordance with a roll-first control law and comprises:

means for processing said two-dimensional sensor data according to a roll-first control law; and means for inputting said two-dimensional sensor data from said sensor means to said means for processing said two-dimensional sensor data according to a roll-first control law.

3. The apparatus of claim 1 wherein said correcting means corrects in accordance with a yaw-first control law and comprises:

means for processing said two-dimensional sensor data according to a yaw-first control law; and means for inputting said two-dimensional sensor data from said sensor means to said means for processing said two-dimensional sensor data according to a yaw-first control law.

4. The apparatus of claim 1 further comprising:

means for transforming said control law into a synthetic space; and means for using said synthetic space in such a manner that the application of said control law is approximated by a simplified calculation.

5. A method for controlling spacecraft attitude in a dynamically controlled yaw rotating spacecraft having axes for locating it in physical space and a vector defined in relation to said axes, said method comprising the steps of:

decoupling moments acting on the spacecraft relative to said vector defined in relation to said axes locating the spacecraft in physical space;

sensing the motion of the spacecraft in two dimensions relative to said vector and producing two-dimensional sensor data indicative thereof;

correcting said decoupled moments in accordance with a control law referenced to said two-dimensional sensor data and producing control signals indicative thereof; and in response to said control signals, providing three-dimensional yaw-steering attitude control relative to said two-dimensional sensor data.

6. The method of claim 5 wherein said two-dimensional sensor data is input to a yaw-first control law.

7. The method of claim 5 wherein said two-dimensional sensor data is input to a roll-first control law.

8. The method of claim 5 wherein said control law is transformed into a synthetic space, and said synthetic space is used in such a manner that the application of said control law is approximated by a simplified calculation.

9. The method of claim 5 wherein said two-dimensional sensor data comprises roll and pitch sensor data.

10. A system for providing momentum-biased attitude control to maintain nadir-pointing and sustain yaw steering simultaneously in a dynamically controlled yaw rotating spacecraft having axes for locating it in physical space and a vector defined in relation to said axes, comprising:

earth horizon sensing means for providing first signals indicative of pitch information and second signals indicative of roll information;

momentum wheel means for providing three-axis attitude control of the spacecraft and generating third signals indicative of feedback therefrom;

control law means, responsive to said first, second, and third signals, for producing control signals in accordance with a selected control law; and means, responsive to said control signals, for decoupling said momentum wheel means from moments acting on the spacecraft relative to said vector defined in relation to said axes locating the spacecraft in physical space, and generating torque command signals for modulating the rotation of said momentum wheel means to produce momentum-biased three-axis attitude control of the spacecraft.

11. A system as in claim 10 wherein said selected control law in accordance with which said control signals are produced by said control law means comprises one of a yaw-first control law and a roll-first control law.

12. A system as in claim 10 wherein said earth horizon sensing means' first and second signals reference said selected control law to two-dimensional sensor data and said momentum wheel means' three-axis attitude control comprises three-dimensional yaw-steering attitude control provided relative to said two-dimensional sensor data.

13. A system as in claim 10 further comprising:

means for transforming said selected control law into a synthetic space; and means for using said synthetic space such that the application of said control law is approximated by a simplified calculation.

14. A system as in claim 10 wherein said decoupling means comprises means for decoupling the angular moments of torques generated by yaw-steering actions relative to said vector.

15. A method for providing momentum-biased attitude control to maintain nadir-pointing and sustain yaw steering simultaneously in a dynamically controlled yaw rotating spacecraft having axes for locating it in physical space and a vector defined in relation to said axes, comprising:

sensing the earth's horizon and providing first signals indicative of pitch information and second signals indicative of roll information;

providing three-axis attitude control of the spacecraft using momentum wheels and generating third signals indicative of feedback therefrom;

in response to said first, second, and third signals, producing control signals in accordance with a selected control law; and in response to said control signals, decoupling said momentum wheels from moments acting on the spacecraft relative to said vector defined in relation to said axes locating the spacecraft in physical space, and generating torque command signals for modulating the rotation of said momentum wheels to produce momentum-biased three-axis attitude control of the spacecraft.

16. A method as in claim 15 wherein said selected control law in accordance with which said control signals are produced comprises one of a yaw-first control law and a roll-first control law.

17. A method as in claim 15 wherein said first and second signals reference said selected control law to two-dimensional sensor data and said three-axis attitude control comprises three-dimensional yaw-steering attitude control provided relative to said two-dimensional sensor data.

18. A method as in claim 15 further comprising the steps of:

transforming said selected control law into a synthetic space; and using said synthetic space such that the application of said control law is approximated by a simplified calculation.

19. A method as in claim 15 wherein said decoupling step comprises decoupling the angular moments of torques generated by yaw-steering actions relative to said vector.

20. A method as in claim 15 wherein said momentum wheels comprise a distributed set of four momentum wheels.

* * * * *